United States Patent Office 3,272,675
Patented Sept. 13, 1966

3,272,675
WATER-RESISTANT ADHESIVES
Hideo Suzumura and Hisao Miyahara, Kurashiki, Japan, assignors to Kurashiki Rayon Co., Ltd., Kurashiki-shi, Japan, a corporation of Japan
No Drawing. Filed June 23, 1961, Ser. No. 119,058
Claims priority, application Japan, July 2, 1960, 35/29,879
2 Claims. (Cl. 156—292)

The present invention relates to water-resistant adhesives containing polyvinyl alcohol which are particularly adapted for use as adhesives in the manufacture of paper products, such as corrugated cardboard, and which impart to the bonded portions of the products produced a strong adhesive power and water-resistance.

At the present time, starch solutions and water glass solutions are primarily used as adhesives in the manufacture of corrugated cardboard and the like.

Thus, in the manufacture of corrugated cardboard according to Japanese Patent 130,266, an alkaline starch solution is used as the adhesive, and the corrugating machine is heated in the necessary areas with high pressure steam of more than 8 kg./cm.² pressure, and there is continuously effected a high-temperature bonding of the liner and core paper. The corrugated roll must of necessity be kept at a certain temperature in order to permit proper corrugation of the core paper, but it has been a long-standing desire of corrugated cardboard manufacturers to have the temperature of bonding as low as possible.

On the other hand, the bonding of one-face corrugated cardboard with a liner by means of a water-glass solution by means of a lining machine, which is practiced extensively in smaller factories, is subject to the serious disadvantage that the product is susceptible of becoming discolored or stained later on.

With the recent expansion of the fields of application of corrugated cardboard, the demand of water-resistance in the bonded portions of the porduct is becoming more and more prevalent. However, corrugated cardboard manufactured by the use of adhesives which are based on starch solutions or water-glass solutions has poor water-resistance in its bonded areas and its bonded portions tend to become exfoliated in a short time if the product comes in contact with water. The problem of providing water-proof bonding is, therefore, one which requires urgent solution.

It is, accordingly, an object of the present invention to provide an improved adhesive for use in the manufacture of corrugated cardboard, and the like.

It is a further object of the invention to provide an adhesive of the character indicated which provides a water-resistant bond.

In accordance with the invention, an adhesive is provided which is based on an aqueous solution of polyvinyl alcohol and which also contains an alkali metal silicate together with a pigment which also serves as a filler.

It is a feature of the invention that the adhesive can be used in the manufacture of paper products, such as corrugated cardboard and can be applied at low temperature.

It is a further feature of the invention that the adhesive gives a very strong adhesive bond which also has high water-resistance.

Other objects and features of the invention will be readily apparent from the following detailed description which includes reference to specific embodiments of the invention.

The new adhesives described above are suitably prepared in the following way:

Commercially available polyvinyl alcohol is dissolved in water. To this solution there is added a pigment-filler, which is suitably kaolinite ($Al_2O_3 \cdot 2SiO_2O$) and silica ($SiO_2$), or a clay such as kaolin. To this mixture, there is added an alkali metal silicate, e.g. sodium silicate, potassium silicate, and lithium silicate. When kaolinite and silica are used as the pigment-filler, the alkali metal silicate may be formed in situ by adding an alkali metal hydroxide, e.g. sodium hydroxide. The three components are thoroughly and uniformly mixed together until a smooth composition is produced.

The chemical reactions involved in the above-mentioned method, particularly in the case of in situ formation of alkali metal silicate are believed to be as follows:

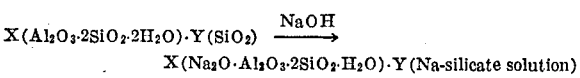

$$X(Al_2O_3 \cdot 2SiO_2 \cdot 2H_2O) \cdot Y(SiO_2) \xrightarrow{NaOH} X(Na_2O \cdot Al_2O_3 \cdot 2SiO_2 \cdot H_2O) \cdot Y(\text{Na-silicate solution})$$

The alkali metal silicate gels which are thus obtained are believed to become stabilized by reason of the presence of hydroxyl ions or groups, i.e. peptization. The hydroxyl radicals of the polyvinyl alcohol are helpful in causing this peptization of the alkali metal silicate gels, thereby reducing the hydrophilic nature of the polyvinyl alcohol resulting from the presence of the hydroxyl radicals. This is believed to be the reason for the strong adhesive power and the water-resistance in the bonded parts exhibited by the adhesive.

In the case of adding preformed alkali metal silicates to clay, it is assumed that there is a formation of alkali silicates of a higher silicate mol ratio.

The invention will be further understood from the following specific examples of practical application. However, it will be understood that these examples are not to be construed as limiting the scope of the present invention in any manner. In these examples, all parts are by weight, unless otherwise indicated.

Example 1

10 kgs. of commercially available polyvinyl alcohol having a degree of polymerization of over 1000 and a degree of saponification of over 88 mol percent were dissolved in warm water to make a solution of about 10% (by weight). An aqueous solution of Japanese (kaolin) clay was prepared by thoroughly dispersing 20 kgs. of the clay in water by means of a dispersing machine such as a homogenizer. The two solutions were then mixed together. To this mixture, 2 kgs. of commercially available No. 3 water glass (sodium silicate having a weight ratio of $SiO_2:Na_2O$ of approximately 3.2), was added. The three components are thoroughly stirred and uniformly mixed together.

The product thus obtained was effectively used in the manufacture of paper products, such as corrugated cardboard, to give the bonded parts of the product a very strong, water-resistant bond.

The following table shows a comparison of the performance of the adhesive of the present invention in comparison with conventional adhesives in the manufacture of corrugated cardboard.

| | Adhesive of the present invention | Starch-base adhesive (Japanese Pat. 130,266) | No. 3 sodium silicate adhesive | Commercially available vinyl acetate emulsion base adhesive |
|---|---|---|---|---|
| Viscosity, centipoises | 200 | 224 | 140 | 200 |
| Concentration, percent by weight | 16 | 16 | 47.4 | 12.8 |
| Adhesive property at normal temperature, gram/cm.²: | | | | |
|   1 min. bonding time | 1,600 | 0 | 2,500 | 240 |
|   3 min. bonding time | 3,230 | 0 | 3,200 | 1,830 |
|   10 min. bonding time | 3,800 | 40 | above 4,000 | 2,700 |
| Heated adhesive property, gram/cm.²: | | | | |
|   3 sec. bonding time | 930 | 1,100 | | 330 |
|   5 sec. bonding time | 2,800 | 2,700 | | 1,140 |
|   10 sec. bonding time | above 3,800 | above 3,800 | | 2,300 |
| Breaking strength, kg./cm.² | 6.8 | 6.1 | 5.5 | |
| Exfoliation temperature in water, °C | 87 | 30–35 | 35–40 | 30 |
| Time required for exfoliation in water at 20° C., min. | (¹) | 7 | 3 | |

¹ Over 48 hours.

In the comparative tests described above, the paper used was "Special BK" liner and yellow corrugated cardboard core paper.

The "adhesive property" at normal (room) temperature was measured by the tension-type exfoliation test with 200 g./cm.² of adhesive applied. The "heated adhesive property" was measured by heating the liner and the core paper at 150° C. for two minutes and quickly applying the adhesive and compressing the paper.

The breaking strength was measured with one-face corrugated cardboard, with the corrugations maintained on the upper side of the test sheet.

The "exfoliation temperature in water" indicates the temperature at which the liner and the core paper became exfoliated when they were suspended in water while the temperature was raised gradually by 1° C. every 2–3 minutes.

Example 2

10 kgs. of commercially available polyvinyl alcohol having a degree of polymerization of over 1000 and a degree of saponification of over 88 mol percent were dissolved in warm water to make a 10% (by weight) solution. There was also prepared an aqueous solution of 20 kgs. of kaolin, well dispersed in water by the method described in Example 1, and the two solutions were mixed together. To this mixture, 1 kg. of a 10% aqueous solution of caustic soda was added. The three components were thoroughly mixed by stirring. The product thus obtained was an adhesive with approximately the same water resistance and adhesive strength as that obtained in Example 1.

The materials and the relative relationships set forth in the examples are those preferred in carrying out this invention, but it will be understood that other materials and relationships may be used within the scope of the invention. In general, unless otherwise indicated, conventional operations and techniques and conventional substances are suitably employed in forming the adhesives of this invention.

Thus, the polyvinyl alcohol suitable for use in accordance with the present invention is commercial polyvinyl alcohol and includes polymers composed principally of the vinyl alcohol radical, but is not limited to pure polyvinyl alcohol. Polyvinyl alcohol is a polymer containing hydroxyl groups and corresponding to the formula:

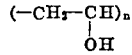

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

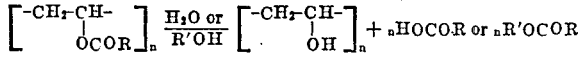

Typical polyvinyl alcohols which can be suitably used are described, for example, in Cline et al. U.S. Patent 2,636,803.

The polyvinyl alcohol may be of the fully or partially saponified type.

The partially-saponified polyvinyl alcohol used in accordance with this invention is produced by conventional techniques from polyvinyl esters, such as polyvinyl acetate, by known saponification procedure as described, for example, in Scott et al. U.S. Patent No. 2,266,996 and Bryant et al. U.S. Patent No. 2,688,809. As is known in the art, a "partially-saponified" polyvinyl alcohol is the product of the hydrolysis of a polyvinyl ester, e.g. polyvinyl acetate, in which less than all of the ester groups, e.g. acetate groups, have been converted to hydroxyl groups. As explained in Scott et al. 2,266,996, the saponification or hydrolysis reaction is stopped by neutralizing the catalyst when the desired percentage conversion has occurred. The partially-saponified polyvinyl alcohols which are suitably used in accordance with this invention are sufficiently saponified to be water-soluble which, according to Bryant et al. 2,668,809, requires the conversion of at least about 75% of the ester groups into hydroxyl groups. The degree of polymerization of the polyvinyl alcohol, upon which viscosity is dependent, may vary widely but is suitably at least about 1000.

Similarly, the pigment-filler is of commercial grade and is suitably any highly silicious material such as the clays referred to above. In like manner, commercial alkali metal silicates are used, the quantities used being based on dry weight.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. A water-resistant adhesive comprising an intimate admixture in water of a three component system consisting essentially of polyvinyl alcohol, a highly siliceous pigment and filler, and an alkali metal silicate, said pigment and filler being present in an amount by weight which is about twice the amount by weight of polyvinyl alcohol, and said silicate being present in an amount by weight which is about one-fifth that of the polyvinyl alcohol, said adhesive being effective to secure together the components of laminated cardboard and to be resistant to exfoliation even during prolonged immersion.

2. In the manufacture of corrugated cardboard resistant to exfoliation even during prolonged immersion, the improvement which comprises adhesively securing the components of the cardboard to each other by means of a water-resistant adhesive comprising an intimate admixture in water of a three component system consisting essentially of polyvinyl alcohol, a highly siliceous pigment, and an alkali metal silicate, said pigment and filler being present in an amount by weight which is about twice the amount by weight of polyvinyl alcohol, and said silicate being present in an amount by weight which is about one-fifth that of the polyvinyl alcohol.

References Cited by the Examiner

UNITED STATES PATENTS

| | | | |
|---|---|---|---|
| 2,287,411 | 6/1942 | Boller et al. | 106—84 |
| 2,413,570 | 12/1946 | Krister et al. | 260—29.6 |
| 2,463,148 | 3/1949 | Caesar | 156—210 |
| 2,833,661 | 5/1958 | Iler | 106—84 |

FOREIGN PATENTS 494,929   11/1938   Great Britain.

EARL M. BERGERT, *Primary Examiner.*

W. F. ZAGURSKI, J. P. MELOCHE,

*Assistant Examiners.*

UNITED STATES PATENT OFFICE
CERTIFICATE OF CORRECTION

Patent No. 3,272,675                 September 13, 1966

Hideo Suzumura et al.

It is hereby certified that error appears in the above numbered patent requiring correction and that the said Letters Patent should read as corrected below.

Column 2, line 9, for "$(Al_2O_3.2SiO_2O)$" read -- $(Al_2O_3.2SiO_2.2H_2O)$ --; column 4, line 27, for "procedure" read -- procedures --; line 29, for "2,688,809" read -- 2,668,809 --.

Signed and sealed this 5th day of September 1967.

(SEAL)
Attest:

ERNEST W. SWIDER                    EDWARD J. BRENNER

Attesting Officer                      Commissioner of Patents

UNITED STATES PATENT OFFICE
CERTIFICATE OF CORRECTION

Patent No. 3,272,675                         September 13, 1966

Hideo Suzumura et al.

It is hereby certified that error appears in the above numbered patent requiring correction and that the said Letters Patent should read as corrected below.

Column 2, line 9, for "$(Al_2O_3 \cdot 2SiO_2O)$" read -- $(Al_2O_3 \cdot 2SiO_2 \cdot 2H_2O)$ --; column 4, line 27, for "procedure" read -- procedures --; line 29, for "2,688,809" read -- 2,668,809 --.

Signed and sealed this 5th day of September 1967.

(SEAL)
Attest:

ERNEST W. SWIDER                      EDWARD J. BRENNER
Attesting Officer                       Commissioner of Patents